United States Patent
Kato (10) Patent No.: US 7,289,797 B2
(45) Date of Patent: Oct. 30, 2007

(54) MOBILE TELEPHONE TERMINAL, METHOD AND SYSTEM FOR BACK-UP OF TELEPHONE DIRECTORY INFORMATION OF MOBILE TELEPHONE TERMINAL

(75) Inventor: Kenichi Kato, Shizuoka (JP)

(73) Assignee: NEC Corporation, Tokyo (JP)

( * ) Notice: Subject to any disclaimer, the term of this patent is extended or adjusted under 35 U.S.C. 154(b) by 632 days.

(21) Appl. No.: 10/909,536

(22) Filed: Aug. 3, 2004

(65) Prior Publication Data
US 2005/0003809 A1    Jan. 6, 2005

(30) Foreign Application Priority Data
Aug. 4, 2003    (JP) .............. 2003-285928

(51) Int. Cl.
H04Q 7/20        (2006.01)
H04M 3/00        (2006.01)
H04M 1/00        (2006.01)

(52) U.S. Cl. ................. 455/415; 455/463; 379/355.02; 379/355.05

(58) Field of Classification Search ........... 455/415, 455/463; 379/355.02, 355.05
See application file for complete search history.

(56) References Cited

U.S. PATENT DOCUMENTS 5,768,362 A * 6/1998 Moon .............. 379/355.05
6,061,571 A * 5/2000 Tamura .............. 455/463
6,643,370 B1 * 11/2003 Kurihara et al. ........ 379/355.02
2005/0003809 A1 * 1/2005 Kato ................. 455/415

FOREIGN PATENT DOCUMENTS

JP    2000-209323    7/2000
JP    2001-298522    10/2001

* cited by examiner

*Primary Examiner*—William Cumming
(74) *Attorney, Agent, or Firm*—McGinn IP Law Group, PLLC

(57) ABSTRACT

To provide a mobile telephone terminal which is capable of mitigating burden on the user when telephone directory information is backed-up and reducing likelihood of erasure of the telephone directory information. If a user newly registers a telephone number list or changes or deletes the telephone number list stored in a telephone directory storage unit by actuating a key entry unit when telephone directory update notification mail transmission preset flag and automatic transmission preset flag are in the on-states, a control unit automatically transmits a telephone directory update notification mail in which update contents of the telephone directory information are described to a mail address which is stored in a transmission destination mail address area.

16 Claims, 5 Drawing Sheets

MOBILE TELEPHONE TERMINAL, METHOD AND SYSTEM FOR BACK-UP OF TELEPHONE DIRECTORY INFORMATION OF MOBILE TELEPHONE TERMINAL

FIELD OF THE INVENTION

The present invention relates to a mobile telephone terminal, a method and system for back-up of telephone directory information of a mobile telephone terminal.

BACKGROUND OF THE INVENTION

A number of techniques for the back-up of telephone directory data stored in a mobile or cellular telephone terminal have been envisaged and implemented.

A technique of the back-up of the telephone directory data of a mobile telephone terminal generally includes connecting the mobile telephone terminal with a personal computer and transferring the telephone directory data to the personal computer from the mobile telephone terminal by using a devoted software.

Another technique has been proposed for transferring telephone directory data to a network server or a personal computer by using an Internet access capability of the mobile telephone terminal without using any cable.

A telephone directory automatic back-up system which transfers telephone directory data of a mobile telephone terminal at intervals of a given period is described in, for example, Patent Document 1 (JP-P2002-132717A).

A telephone directory management server is disclosed in Patent Document 2 (JP-P2002-335334A). If the back-up of telephone directory data of a mobile telephone terminal is desired, a user requests a telephone directory management server to register telephone directory data by actuating given keys of the mobile telephone terminal. Then the mobile telephone terminal transfers telephone directory data to the server, so that the transferred telephone directory data is stored in the server A method of the back-up of telephone directory information is disclosed in Patent Document 3 (JP-P2001-177624A). In this method, when the back-up of telephone directory data of the mobile telephone terminal is desired, the user actuates given keys of the mobile telephone terminal to select "the back-up of the telephone directory". The mobile telephone terminal then converts the telephone directory data into CSV format data (with comma delimiters). The converted data is transferred to a data center or personal computer in the form of an electronic mail.

A system of managing telephone directory of a mobile telephone is disclosed in Patent Document 4 (JP-P2002-57807A). In this system, a telephone directory server is provided with replica telephone directory data. If the back-up of the telephone directory data of a mobile telephone terminal is desired, the user actuates given keys of the mobile telephone terminal to select "Save data in center". Then, the mobile telephone terminal transfers the telephone directory data to a telephone directory server.

[Patent Document 1] JP-P2002-132717A
[Patent Document 2] JP-P2002-335334A
[Patent Document 3] JP-P2001-177624A
[Patent Document 4] JP-P2002-57807A

SUMMARY OF THE DISCLOSURE

In the telephone directory automatic back-up system as disclosed in Patent Document 1, the interval of transferring the telephone directory data of the mobile telephone terminal should be preset by the user.

In the methods of the back-up of the telephone directory data according to Patent Documents 1 to 4, transmission of the telephone directory data is carried out only when the user conducts predetermined actuations by his or her own intention. Therefore, an operation to conduct the back-up of the telephone directory data should be conducted by the user.

In the techniques as disclosed in claims 1 to 4, there is a problem that the telephone directory data which was updated after the previous back-up will disappear if the mobile telephone terminal is lost or the telephone directory data of the mobile telephone terminal is corrupted by an accident since the update of the telephone directory data is updated until the updated telephone directory data is transmitted to the server or the personal computer.

Since the up-to-date telephone directory data is merely transmitted to the server or the personal computer in the techniques of the Patent Documents 1 to 4, a problem will occur that the telephone directory data which is accidentally erased can not be recovered if the telephone directory data is accidentally erased by wrong actuation of the registration on the telephone directory of the mobile telephone terminal.

It is an object of the present invention to provide a mobile telephone terminal and a method and system for back-up of the telephone directory information which mitigates the burden on the user when the telephone directory information is backed-up and reduces the likelihood of disappearing of the telephone directory information.

In order to accomplish the above-mentioned object of the present invention, there is provided a mobile telephone terminal according to a first aspect of the present invention. It is characterized in that the mobile telephone terminal comprises a telephone directory storage unit for storing telephone directory information including at least one telephone number list having telephone number information representative of at least telephone number and identification information for identifying an object related with the telephone number; an information entry unit to which update information is entered; and an information control unit which updates the telephone directory information based upon update information when the update information is entered into the information entry unit, and transmits an update information back-up signal representative of updated content.

Since the telephone directory information stored in the telephone directory storage unit is updated based upon update information and the update information back-up signal representative of updated content is transmitted when the update information is entered to the information entry unit in accordance with the above-mentioned invention, it is possible to store the updated content in an external storage unit whenever the telephone directory information is updated. The period of time since the telephone directory information is updated until the updated content is stored in the external storage unit can be made shorter and the likelihood of the disappearing of the content which is updated prior to storing in the external storage unit can be reduced without requiring the user to conduct any operation for transmitting the updated content when the updated content is stored in the external storage unit.

If the updated content is transferred per unit of the telephone number list on the one-by-one basis, the period of time for transferring the update information can be made shorter and the likelihood that the telephone directory information is influenced by noise during transferring is reduced as compared with the case where all the telephone directory information stored in the telephone directory storage unit is transferred to an external storage unit, by one operation.

According to a second aspect of the present invention, there is provided a mobile telephone terminal characterized in that a new telephone number list is entered to the information entry unit as the update information; and in that when the telephone number list is entered to the information entry unit, the information control unit updates the telephone directory information by storing a new telephone number list in the telephone directory storage unit and transmits an update information back-up signal representative of the new telephone number list.

In accordance with the second aspect, an effect is similar to that as mentioned above with respect to the first aspect can be provided and it is possible to automatically store a new telephone number list in an external storage unit whenever the new telephone number list is stored in the telephone directory storage unit.

According to a third aspect of the present invention, there is provided a mobile telephone terminal characterized in that change information representative of a content of a change in information possessed by a desired telephone number list stored in the telephone directory storage unit is entered into the information entry unit as the update information; and in that when change information is entered to the information entry unit, the information control unit updates the telephone directory information by changing information possessed by the desired telephone number list and transmits an update back-up signal representative of changed content.

In accordance with the third aspect, an effect which is similar to that as mentioned above with respect to the first aspect is obtained and it is possible to automatically store change information in an external storage unit whenever the content of desired telephone number list stored in the telephone directory storage unit is changed based upon the change information.

According to a fourth aspect of the present invention, there is provided a mobile telephone terminal characterized in that when the information control unit performs the update, the information control unit transmits an update information back-up signal which is representative of a desired pre-change telephone number list and changed desired telephone number list.

Since it is possible to store the pre-change desired telephone number list and changed desired telephone number list in the external storage unit in accordance with the fourth aspect, it is possible to acquire the pre-change telephone number list from the external storage unit even if the content of the telephone number list is changed to a wrong content by erroneous operation for updating the telephone number list on the telephone directory storage unit.

According to a fifth aspect of the present invention, there is provided a mobile telephone terminal characterized in that deletion information for deleting a desired telephone number list stored in the telephone directory storage unit is entered into the information entry unit as the deletion information; and in that when the deletion information is entered to the information entry unit, the information control unit updates the telephone directory information by deleting the desired telephone number list and transmits an update back-up signal representative of deleted desired telephone number list.

Since it is possible to store deleted desired telephone number list in an external storage unit in accordance with the fifth aspect, it is possible to acquire the deleted telephone number list from the external storage unit even if the telephone number list is deleted by an erroneous operation for updating the telephone number list on the telephone number list on the telephone directory storage unit.

According to a sixth aspect of the present invention, there is provided a system for back-up of telephone directory information comprising a mobile telephone terminal and a storage unit which is connectable with the mobile telephone terminal via a communication network and is characterized in that the storage unit stores the update information back-up signal.

In accordance with the sixth aspect, it is possible to provide a back-up system of telephone directory information which provides the effect similar to those as mentioned above with respect to any one of the preceding aspects.

According to a seventh aspect of the present invention, there is provided a method of the back-up of telephone directory information of a mobile telephone terminal. The method comprises a telephone directory storage unit for storing telephone directory information containing at least one telephone number list having telephone number information representative of telephone number and identification information for identifying an object which is related with the telephone number, and is characterized in that the method comprises the steps of: entering update information; updating the telephone directory information based upon the update information which is entered at the step of entering update information; and transmitting an update information back-up signal representative of a content which is updated at the updating step.

Since the telephone directory information stored in the telephone directory storage unit is updated based upon update information and the update information back-up signal representative of updated content is transmitted when the update information is entered to the information entry unit in accordance with the seventh aspect, it is possible to store the updated content in an external storage unit whenever the telephone directory information is updated. The period of time since the telephone directory information is updated until the updated content is stored in the external storage unit can be made shorter and likelihood of disappearing of the content which is updated prior to storing in the external storage unit can be reduced without requiring the user to conduct any operation for transmitting the updated content when the updated content is stored in the external storage unit.

According to an eighth aspect of the present invention, there is provided a method of the back-up of telephone directory information of a mobile telephone terminal. The method is characterized in that a new telephone number list is entered as the update information at the information entering step, in that the telephone directory information is updated by storing the novel telephone number list which is entered at the information entering step in the telephone directory storage unit at the updating step; after the updating step, the update information back-up signal representative of the novel telephone number list is transmitted at the transmitting step.

In accordance with the above-mentioned aspect, an effect is similar to that as mentioned above with respect to the seventh aspect can be provided and it is possible to automatically store a new telephone number list in an external storage unit whenever the new telephone number list is stored in the telephone directory storage unit.

According to a ninth aspect of the present invention, there is provided a method of the back-up of telephone directory information of a mobile telephone terminal. The method is characterized in that the change information representative of the contents to be changed of the information possessed by a desired telephone number list stored in the telephone directory storage unit is entered as the-update information at the information entering step, in that the telephone directory information is updated at the updating step by changing the information possessed by the desired telephone number list based upon the change information entered at the information entering step; and in that subsequently to the updating step, the update information back-up signal which is representative of the change information is transmitted at the transmitting step.

In accordance with the above-mentioned aspect, an effect which is similar to that as mentioned above with respect to the seventh aspect is obtained, and it is possible to automatically store change information in an external storage unit whenever the content of a desired telephone number list stored in the telephone directory storage unit is changed based upon the change information.

According to a tenth aspect of the present invention, there is provided a method of the back-up of the telephone directory information of a mobile telephone terminal. The method is characterized in that subsequently to the updating step, the update information back-up signal which is representative of the pre-change desired telephone number list and the changed desired telephone number list is transmitted at the transmitting step.

Since an update information back-up signal representative of pre-change desired telephone number list and changed desired telephone number list is transmitted in accordance with this aspect, it is possible to acquire a pre-change telephone number list from an external storage unit even if the content of the telephone number list is changed into a wrong content by an erroneous operation for updating the telephone number list on the telephone directory storage unit.

According to an eleventh aspect of the present invention, there is provided a method of the back-up of telephone directory information of a mobile telephone terminal. The method is characterized in that deletion information for deleting a desired telephone number list stored in the telephone directory storage unit is entered as the deletion information at the information entering step, in that the telephone directory information is deleted at the updating step by deleting the desired telephone number list based upon the deletion information entered at the information entering step; and in that subsequently to the updating step, the update information back-up signal which is representative of the deleted desired telephone number list is transmitted at the transmitting step.

Since an update information back-up signal representative of deleted desired telephone number list is transmitted in accordance with the present aspect, it is possible to acquire the deleted telephone number list from the external storage unit even if the telephone number list is deleted by an erroneous operation for updating of the telephone number list on the telephone number list on the telephone directory storage unit.

According to a twelfth aspect of the present invention, there is provided a method of the back-up of telephone directory information of a mobile telephone terminal. The method is characterized in that the method further includes a step of storing the update information back-up signal in a storage unit based upon the update information back-up signal transmitted at the transmitting step.

In accordance with the above-mentioned aspect, it is possible to provide a back-up system of telephone directory information which provides the effect similar to that as mentioned above with aspect to the seventh aspect.

The meritorious effects of the present invention are summarized as follows.

Since the telephone directory information stored in the telephone directory storage unit is updated based upon update information and the update information back-up signal representative of updated content is transmitted when the update information is entered to the information entry unit in accordance with the present invention, it is possible to store the updated content in an external storage unit whenever the telephone directory information is updated. The period of time since the telephone directory information is updated until the updated content is stored in the external storage unit can be made shorter and the likelihood of the disappearing of the content which is updated prior to storing in the external storage unit can be reduced without requiring for the user to conduct any operation for transmitting the updated content when the updated content is stored in the external storage unit.

If the updated content is transferred per unit of the telephone number list on the one-by-one basis, the period of time for transferring the update information can be made shorter and the likelihood of that the telephone directory information is influenced by noise during transferring is reduced in comparison with the case where all the telephone directory information stored in the telephone directory storage unit is transferred to an external storage unit, by one operation.

Since an update information back-up signal representative of pre-change desired telephone number list and changed desired telephone number list is transmitted in accordance with the present invention, it is possible to acquire a pre-change telephone number list from an external storage unit even if the content of the telephone number list is changed into a wrong content by an erroneous operation for updating the telephone number list on the telephone directory storage unit.

Since an update information back-up signal representative of a deleted desired telephone number list is transmitted in accordance with the present invention, it is possible to acquire the deleted telephone number list from the external storage unit even if the telephone number list is deleted by an erroneous operation for updating of the telephone number list on the telephone number list on the telephone directory storage unit.

PREFERRED EMBODIMENTS OF THE INVENTION

Now, an embodiment of the present invention will be described with reference to the drawings.

Figure 1:
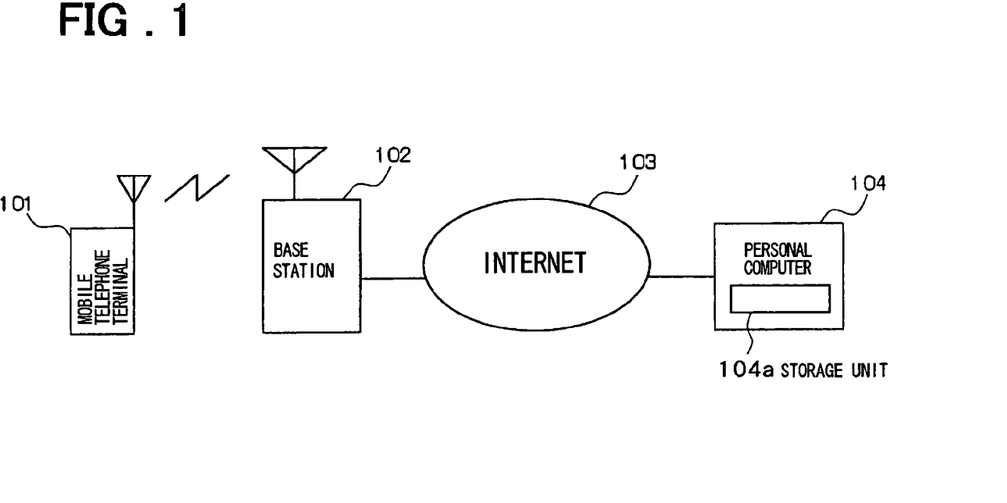
FIG. 1 is a block diagram showing a back-up system of a telephone directory information which is one embodiment of the present invention.

FIG. 1 is a block diagram showing a back-up system for telephone directory information of mobile telephone terminals.

In FIG. 1, the back-up system of the telephone directory of mobile telephone terminals comprises a mobile telephone terminal 101, a base station 102, the Internet 103 and a personal computer 104.

The mobile telephone terminal 101 stores telephone directory information including at least one list of telephone numbers having at least telephone number information representative of a telephone number and identification information which identifies an object (for example a person or entity which uses the telephone number) which is related with the telephone number. The telephone directory information comprises the list of a plurality of telephone numbers.

The mobile telephone terminal 101 is capable of transmitting or receiving voice and other data (information) to and from the base station 102 by conducting radio-communication therewith. The base station 102 is connected with the personal computer 104 via the Internet 103. The personal computer 104 comprises a storage unit 104a as an external storage unit.

The mobile telephone terminal 101 is capable of transmitting and receiving electronic mails (E-mails) to and from the personal computer 104 via a communication network comprising the base station 102 and the Internet 103. The mobile telephone terminal 101 is capable of transferring a list of telephone numbers stored in the mobile telephone terminal 101 to the storage unit 104a in the personal computer 104 for storing it therein. The mobile telephone terminal 101 is capable of acquiring the telephone number list from the storage unit 104a in the personal computer 104 via the communication terminal comprising the base station 102 and the Internet 103.

In the present embodiment, the storage unit 104a in the personal computer 104 is used as the external storage unit for storing the telephone number list which is stored in the mobile telephone terminal 101. The external storage unit is not limited to the storage unit in the personal computer and may be changed if desired. For example, it may be a storage unit in a server which is connected to the communication network such as the Internet.

Figure 2:
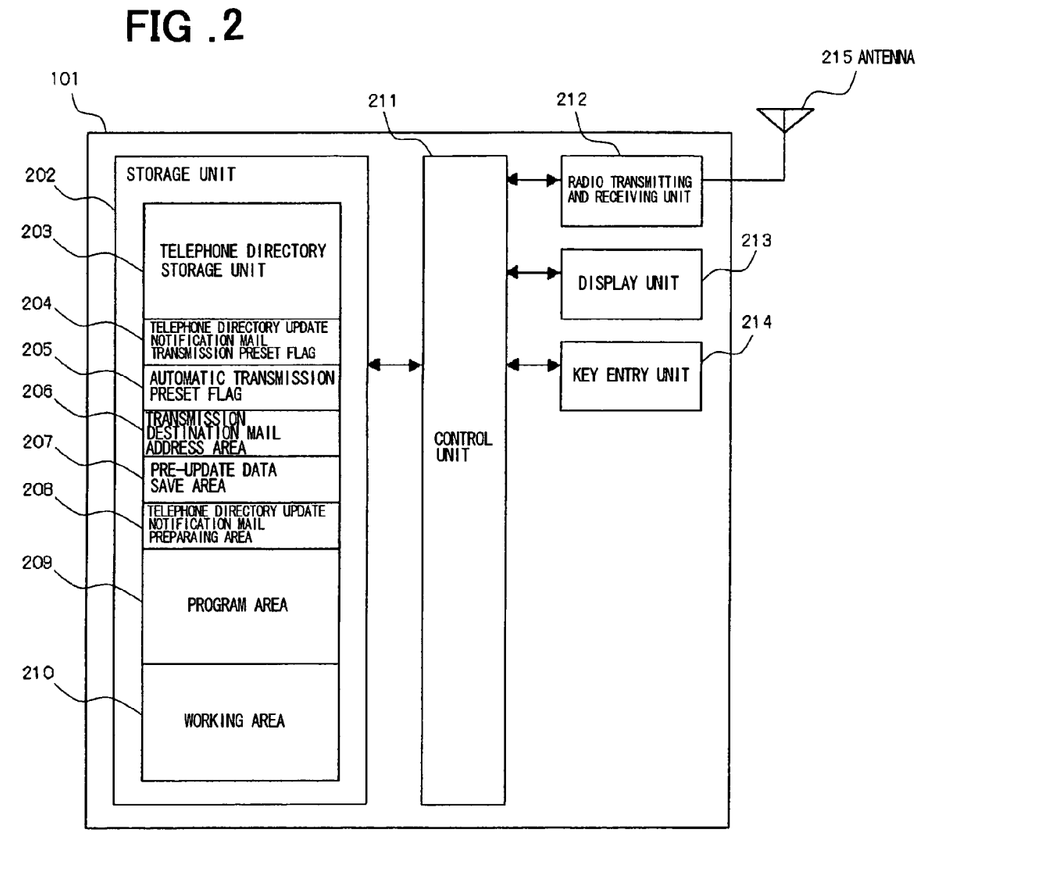
FIG. 2 is a block diagram showing a mobile telephone terminal which is one embodiment of the present invention.

FIG. 2 is a block diagram showing an exemplary mobile telephone terminal 101.

In FIG. 2, the mobile telephone terminal 101 comprises a storage unit 202, control unit 211, radio transmitting and receiving unit 212, display unit 213, key entry unit 214 and antenna 215.

The storage unit 202 stores programs and various data therein. Specifically, the storage unit comprises a telephone directory storage unit 203, a telephone directory update notification mail transmission preset flag 204, an automatic transmission preset flag 205, a transmission destination mail address area 206, a pre-update data save area (i.e., temporary storing area) 207, a telephone directory update notification mail preparation area 208, a program area 209 and a working area 210.

The telephone directory storage unit 203 stores telephone directory information including at least one list of telephone numbers having at least telephone number information representative of a telephone number and identification information which identifies an object (for example a person or entity which uses the telephone number) which is related with the telephone number. The telephone directory information comprises the list of a plurality of telephone numbers. For example, the telephone directory storage unit 203 is capable of storing a list of a plurality of telephone numbers, which is prepared for each item of identification information.

In the present embodiment, one telephone number list is information (i.e., a set of items) which correlates the telephone number information representative of a telephone number, name information (identification information) representative of the name of a user who uses the telephone number in interest, and mail address information which is representative of an electronic mail address which is used by the user, with each other. A plurality of items of mail address information included in one telephone number list may exist.

Updating of telephone directory information such as storage of a new telephone number list on the telephone directory storage 203, change in the contents of desired telephone number list (telephone number information, name information or mail address information) in the telephone directory information stored in the telephone directory storage unit 203 and deletion of a desired telephone number list in the telephone directory information stored in the telephone directory storage unit 203 is conducted by the control unit 211 based upon update information which is entered by the actuation of the key entry unit 214.

The telephone directory update notification mail transmission preset flag 204 is a flag which presets whether or not transmission of a telephone directory update notification mail as an update information back-up signal representing the update content of the telephone directory information which is updated based upon the update information entered from at least the key entry unit 214.

The update information which is entered from the key entry unit 214 means a telephone number list which is newly stored in the telephone directory storage unit 203 in case where a new telephone number list is stored in the telephone directory storage unit 203, means a changed content in case where a content of a desired telephone number list in the telephone directory information stored in the telephone directory storage unit 203 is changed, and also means the telephone number list to be deleted in case where a desired telephone number list in the telephone directory information stored in the telephone directory unit 203 is deleted.

The telephone directory update notification mail transmission preset flag 204 is preset to either one of off- and on-states by the actuation of the key entry unit 214.

When the telephone directory notification mail transmission preset flag 204 is in the on-state, the control unit 211 enables the transmission of the telephone directory notification mail. When it is in the off state, the control unit 211 does not enable the transmission of the telephone directory update notification mail. Accordingly, when the voltage of the power supply of the mobile telephone terminal 101 is in a low state, and prevention of further lowering of the power supply voltage due to the execution of the telephone directory update notification mail is desired, it suffices to bring the telephone directory update notification mail transmission preset flag 204 into an off-state.

If there is no need to prohibit the transmission of the telephone directory update notification mail, the telephone directory update notification mail transmission preset flag 204 may be omitted in the present embodiment.

The automatic transmission preset flag 205 presets whether or not automatic transmission of the telephone directory update notification mail is to be conducted. The automatic transmission preset flag 205 is preset to either of on- and off-states by actuation of the key entry unit 214.

In the present embodiment when the automatic transmission preset flag 205 is in the on-state, the control unit 211 automatically transmits the telephone directory notification mail. When the automatic transmission preset flag 205 is in the off-state, the control unit 211 causes the display unit 213 to display a display which prompts the user to select whether or not the telephone directory update notification mail is transmitted to the storage unit 104*a* in the personal computer 104, for example, a display "TO TRANSIT?", meaning "To transmit telephone directory update notification mail?"

The control unit 211 transmits the telephone directory update notification mail to the storage unit 104*a* in the personal computer 104 if transmission of the telephone directory update notification mail is selected by actuation of the key entry unit 214.

The control unit 211 does not transmit the telephone directory update notification mail to the storage unit 104*a* of the personal computer 104 if non-transmission of the telephone directory update notification mail to the storage unit 104*a* in the personal computer 104 is selected by actuation of the key entry unit 214.

In the present embodiment, the automatic transmission flag may be omitted if there is no need to confirm whether or not the telephone directory notification update notification mail is to be automatically transmitted.

An electronic mail address which is representative of the destination of the telephone directory update notification mail is stored in the transmission destination mail address area 206. In the present embodiment, an electronic mail address which is assigned to the personal computer 104 having the storage unit 104*a* is stored in the area 206.

The pre-update data save area 207 stores a specified telephone number list of the telephone directory information stored in the telephone directory storage unit 203, if the content thereof is specified to be edited (changed or deleted) by actuation of the key entry unit 214.

The telephone directory update notification mail preparation area 208 is used for preparing a telephone directory update notification mail by the control unit 211.

The program area 209 stores programs which determine the operation of the mobile telephone terminal 101. Based on the programs stored therein, the control unit 211 executes various processings. The working area 210 is used for conducting an arithmetic operation by the control unit 211.

The radio transmitting and receiving unit 212 conducts radio-communication with the base station 102 via the antenna 215. For example, the radio transmitting and receiving unit 212 transmits the telephone directory update notification mail which was prepared by the control unit 211 to the base unit 102 via the antenna 215. Furthermore, the radio transmitting and receiving unit 212 transmits the telephone directory update notification mail which was prepared by the control unit 211 to the personal computer 104 including the storage unit 104*a* via the antenna 215, base station 102 and the Internet 103.

The display unit 213 performs display such as various menu displays for the user. For example, the display unit 213 displays a telephone directory update menu for updating telephone directory information stored in the telephone directory storage unit 203. The display unit 213 also displays a screen for new registration for storing a new telephone number list. The display unit 213 also displays the telephone number list stored in the telephone directory storing unit 203. The display unit 213 also displays a screen to prompt the user to select whether or not transmission of a telephone directory update notification mail is to be conducted to the user.

The display unit 213 also displays a telephone directory update notification mail transmission preset menu for presetting the state of the telephone directory update notification mail transmission presetting flag 204. The display unit 203 also displays a transmitting destination mail address of the telephone directory update notification mail. The display unit 213 also displays an automatic transmission presetting menu for presetting the state of the automatic transmission presetting flag 205.

Various items of information are input to the key entry unit 214 serving as an information entry unit by being actuated by the user, and the key entry unit 214 supplies the control unit 211 with the entered information. The information entry unit is not limited to the key entry unit, but may be changed with other appropriate unit.

Update information for updating telephone directory information stored in the telephone directory storage unit 203 is entered to the key entry unit 214 which is actuated, e.g., by a user.

Specifically, a new telephone number list is entered to the key entry unit 214 as update information for updating the telephone directory information stored in the telephone directory storage unit 203 if a new telephone number is stored in the telephone directory storage unit 203.

The changed content of a desired telephone number list is entered to the key entry unit 214 if the content of the desired telephone number list in the telephone directory information stored in the telephone directory storage unit 203 is changed. If a content of a desired telephone number list in the telephone directory information stored in the telephone directory storage unit 203 is deleted, information for deleting the desired telephone number list is entered into the key entry unit 214.

Information for selecting whether or not the telephone directory update notification mail is transmitted to the storage unit 104*a* in the personal computer 104 is entered to the key entry unit 214 by actuation by the user.

The control unit 211 which serves as an information control unit is connected with the storage unit 202, radio transmitting and receiving unit 212, display unit 213 and key entry unit 214 for controlling the mobile telephone terminal 101.

When the user conducts an entry for storing a new telephone number list in the telephone directory storage unit 203 by actuating the key entry unit 214, the control unit 211 stores the new telephone number list which was entered from the key entry unit 214 in the telephone directory storage unit 203.

When the user conducts an entry for changing the content of a specified telephone number list stored in the telephone directory storing unit 203 by actuating the key entry unit 214, the control unit 211 changes the content of the specified telephone number list stored in the telephone directory storage unit 203 based upon the content entered from the key entry unit 214.

When the user conducts an entry for deleting the content of a specified telephone number list stored in the telephone directory storing unit 203 by actuating the key entry unit 214, the control unit 211 deletes the content of the specified telephone number list stored in the telephone directory storage unit 203.

When the telephone directory information stored in the telephone directory storage unit 203 is changed based upon the update information entered from the key entry unit 214, the control unit 211 transmits a telephone directory update notification mail for storing at least update information to the storage unit 104*a* in the personal computer 104.

Also, the control unit 211 transmits, to the storage unit 104a in the personal computer 104, a telephone directory update notification mail for causing a new telephone number list newly entered to be stored in the storage unit 104a in the personal computer 104, when the new telephone number list is stored in the telephone directory storage unit 203.

When a telephone number list stored in the telephone directory storage unit 203 is updated based upon update information entered from the key entry unit 214, the control unit 211 transmits a telephone directory update notification mail for storing the updated telephone number list and pre-update telephone number list in the storage unit 104a in the personal computer 104 to the storage unit 104a in the personal computer 104.

When a telephone number list stored in the telephone directory storage unit 203 is deleted based upon a deletion information entered from the key entry unit 214, the control unit 211 transmits a telephone directory update notification mail for storing the deleted telephone number list in the storage unit 104a in the personal computer 104 to the storage unit 104a in the personal computer 104.

Now, operation will be described briefly.

If the user newly registers a telephone number list or changes or deletes a telephone number list stored in the telephone directory storage unit 203 by actuating the key entry unit 214 under the condition that the telephone directory update notification mail preset flag 204 and the automatic transmission preset flag 205 are both in the on-state, the control unit 211 automatically transmits a telephone directory update notification mail in which the updated content of the telephone directory information is described to the mail address stored in the transmission destination mail address area 206.

Since the updated information included in the telephone directory update notification mail which is automatically transmitted when the telephone number list is changed or deleted includes a "pre-update" telephone number list in the present embodiment, the control unit 211 stores the pre-update telephone number list in the pre-update data save area 207 and prepares a telephone directory update notification mail including the pre-update telephone number list which is stored in the pre-update data save area 207 by using a telephone directory update notification mail preparing area 208.

If the telephone directory update notification mail transmission preset flag 204 and the automatic transmission preset flag 205 are in the on- and off-states, respectively, the control unit 211 causes the display unit 213 to display a confirmation message whether or not transmission of the telephone directory update notification mail is to be conducted for prompting the user to select whether the transmission of the telephone directory update notification mail is to be conducted.

If the telephone directory update notification mail transmission preset flag 204 is in the off-state, the control unit 211 does not transmit the telephone directory update notification mail. The states of the telephone directory update notification mail transmission preset flag 204 and the automatic transmission preset flag 205 are preliminarily preset by the user actuating the key entry unit 214.

Now, operation will be described.

Figure 3:
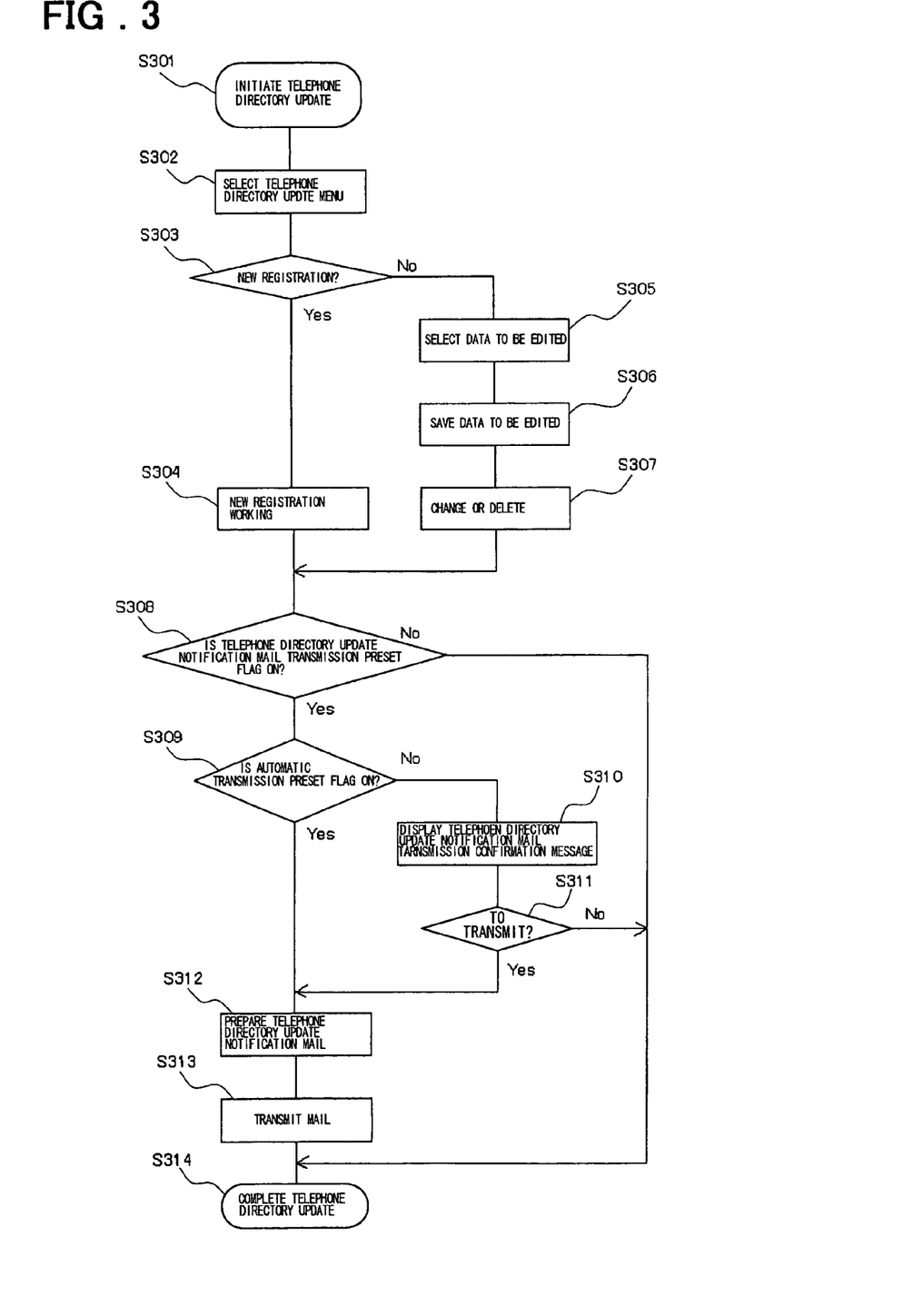
FIG. 3 is a flow chart explaining the operation of the mobile telephone terminal which is shown in FIG. 2.

FIG. 3 is a flow chart explaining the operation of the mobile telephone terminal 101 which is shown in FIGS. 1 and 2.

Now, the operation of the mobile telephone terminal 101 will be described with reference to FIG. 3.

Entry operation is conducted from the key entry unit 214 by the user. Display of menu and the like for the user is conducted by the display unit 213.

When an entry for causing the display unit 213 to display the telephone directory update menu is conducted by the user actuating the key entry unit 214, the control unit 211 causes the display unit 213 to display the telephone directory update menu (step S301). The telephone directory update menu which is displayed by the display unit 213 requests the user to select any one of new registration, change of the telephone number list which is stored in telephone directory storage unit 203, and deletion of the telephone number list which is stored in the telephone directory storage unit 203.

The user selects any one of the new registration, the change in the content of the telephone number list which is stored in the telephone directory storage unit 203 and the deletion of the telephone number list which is stored in the telephone directory storage unit 203 by actuating the key entry unit 214 (step S302).

If the user selects the new registration from the telephone directory update menu (step S303), the control unit 211 causes the display unit 213 to display a shot of display for new registration.

The user conducts the new registration of the telephone number list by entering necessary registration information, specifically identification information, telephone number information and mail address information by actuating the key entry unit 214 based upon the shot for the new registration which is displayed by the display unit 213 (step S304). The information which is entered at step S304 may be the identification information and the telephone number information.

The control unit 211 stores a new telephone number list which is entered at step S304 in the telephone number storage unit 203.

If the user selects the change of the telephone number list which is stored in the telephone directory storage unit 203 or the deletion of the telephone number list which is stored in the telephone directory storage unit 203 at step S302, the control unit 211 causes the display unit 213 to display the telephone number list which is stored in the telephone directory storage unit 203.

The user actuates the key entry unit 211 to select the telephone number list to be changed or the telephone number list to be deleted from the telephone number list displayed by the display unit 213 as data to be edited (step S305).

The control unit 211 saves (temporarily stores) the data to be edited which is selected at step S305 in the update data save area 207 (step S306).

The control unit 211 causes the display unit 213 to display the shot for editing (changing or deleting) the telephone number list which is selected at step S305. The user changes or deletes the telephone number list which is to be edited by actuating the key entry unit 214 based upon the shot for edition which is displayed by the display unit 213 (step S307).

If the content of the telephone number list is changed at step S307, the control unit 211 stores the changed telephone number list in the telephone directory storage unit 203. If the telephone number list is deleted at step S307, the control unit 211 deletes the to-be-deleted telephone number list which is deleted from the telephone directory storage unit 203.

When the new registration at step S304, or the change or the deletion at step S307 is completed, the control unit 211 determines the states of the telephone directory update notification mail transmission preset flag 204 and the automatic transmission preset flag 205.

If the telephone directory update notification mail transmission preset flag 204 and the automatic transmission preset flag 205 are in the on-states (Yes at steps S308, S309), the control unit 211 prepares the telephone directory update notification mail at the telephone directory update notification mail preparation area 208 without confirmation by the user (step S312).

The telephone directory update notification mail which is prepared at step S312 has different contents depending upon the update of the telephone directory information (any one of new registration, change and deletion).

If a new telephone number list is newly prepared based upon the update information which is entered from the key entry unit 214, the control unit 211 prepares a telephone directory update notification mail for storing the newly prepared telephone number list in the storage unit 104a in the personal computer 104.

When the telephone number list which is stored in the telephone directory storage unit 203 is updated based upon the update information which is entered from the key entry unit 214, the control unit 211 prepares a telephone directory update notification mail for storing the updated telephone number list and the pre-update telephone number list in the storage unit 104a in the personal computer 104.

When the telephone number list which is stored in the telephone directory storage unit 203 is deleted based upon the deletion information entered from the key entry unit 214, the control unit 211 prepares a telephone directory update notification mail for storing the deleted telephone number list in the storage unit 104a in the personal computer 104.

The control unit 211 transmits the telephone directory update notification mail which is prepared at step S312 to the mail address stored in the transmission destination mail address area 206 (the mail address assigned to the personal computer 104 shown in FIG. 1 in the present embodiment) (step S313).

If the telephone directory update notification mail transmission preset flag 204 and the automatic transmission preset flag 205 are in the on- and off-states, respectively (at steps S308, S309), the control unit 211 causes the display unit 213 to display to prompt the user to select whether or not the telephone directory update notification mail transmission is conducted, for example, to display a confirmation message "TO TRANSMIT?", i.e., "Is telephone directory update notification mail to be transmitted?" (step S310).

If the user selects the transmission of the telephone directory update notification mail by actuating the key entry unit 214 (Yes at step S311), the control unit 211 proceeds to step S312 to prepare the telephone directory update notification mail at the telephone directory update notification mail preparation area 208 and transmits the prepared telephone directory update notification mail to the mail address stored in the transmission destination mail address area 206 (step S313).

If the user enters that the transmission of the telephone directory update notification mail is not desired via the key entry unit 214 (No) at step S311, the control unit 211 terminates the update of the telephone directory (step S314) without conducting the preparation of the telephone directory update notification mail at step S312 and the transmission of the telephone directory update notification mail at step S313.

If the telephone directory update notification mail transmission preset flag 204 is in the off-state (No) at step S308, the control unit 211 completes the telephone directory update without conducting the preparation of the telephone directory update notification mail at step S312 and the transmission of the telephone directory update notification mail at step S311.

Figure 4:
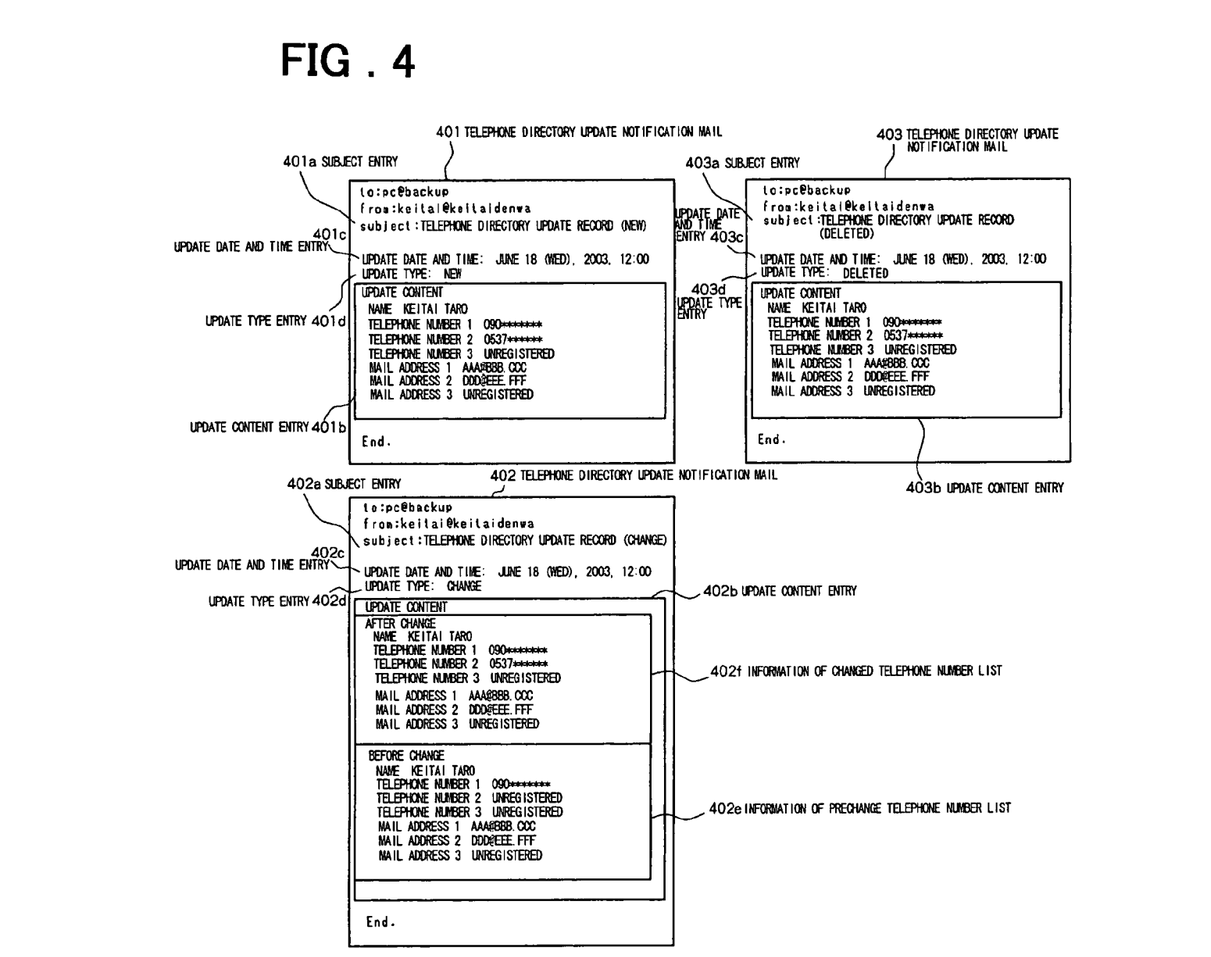
FIG. 4 is an explanatory view showing an example of the telephone directory update notification mail which is prepared by the control unit 211 shown in FIG. 2.

FIG. 4 is a view showing an example of the telephone directory update notification mail which is prepared by the control unit 211.

In the present embodiment, the contents which can be registered in one telephone number list include a name, three telephone numbers and three mail addresses as identification information for identifying the telephone number. The contents which can be registered in one telephone number list are not limited to one name, three telephone numbers and three mail addresses. They may be appropriately changed.

If a telephone number list is newly registered, the telephone directory update notification mail 401 is described as "TELEPHONE DIRECTORY UPDATE RECORD (NEW)" in the subject entry 401a. Specifically, contents of a name, three telephone numbers and three mail addresses which were newly registered at step S304 are described in updated content entry 401b. The date and time when new registration was conducted is described in the update date and time entry 401c. "NEW" is described in update type entry 401d.

The telephone directory update notification mail 402 in case where the contents of the telephone number list stored in the telephone directory storage unit 203 are changed is described as "TELEPHONE DIRECTORY UPDATE RECORD (CHANGE)" in the subject entry 402a. Both of information 402e which is representative of the contents of the pre-change telephone number list and information 402f which is representative of the contents of the changed telephone number list are described in the (updated) UPDATE CONTENT ENTRY 402b. The head of the item of the telephone number list which has been changed is marked with an asterisk "*". The date and time when the change was conducted is set forth in the UPDATE DATE AND TIME ENTRY 402c. "CHANGE" (changed) is set forth in the update type entry 402d.

The telephone directory update notification mail 403 in case where the telephone number list stored in the telephone directory storage unit 203 is deleted is set forth as "TELEPHONE DIRECTORY UPDATE RECORD (DELETED)" in the subject entry 403a. The contents of the telephone number list are set forth in the update content entry 403b. The date and time when the change is conducted is set forth in the update date and time entry 403c and "DELETED" is set forth in update type entry 403d.

The telephone directory update notification mail which is prepared by the control unit 211 is not limited to tat shown in FIG. 4, but may be appropriately changed.

The telephone directory update notification mail which is transmitted from the mobile telephone terminal 101 is transmitted to the personal computer 104 via the base station 102 and the Internet 103. The personal computer 104 stores the telephone directory update notification mail which is transmitted from the mobile telephone terminal 101 in the storage unit 104a. Therefore, it is possible to store the telephone directory information for the backup of the telephone directory information stored in the telephone directory storage unit 203 in the storage unit 104a.

The telephone directory update notification mail which is stored in the storage unit 104a is transmitted to the mobile telephone terminal via the base station 102 and the Internet 103 in response to an acquisition request from the mobile telephone terminal. The telephone directory update notification mail which is stored in the storage unit 104a may be transmitted to an electronic instrument which requests the acquisition via the base station 102 and the Internet 103 in response to an acquisition request from the electronic instrument which is different from the mobile telephone terminal.

Figure 5:
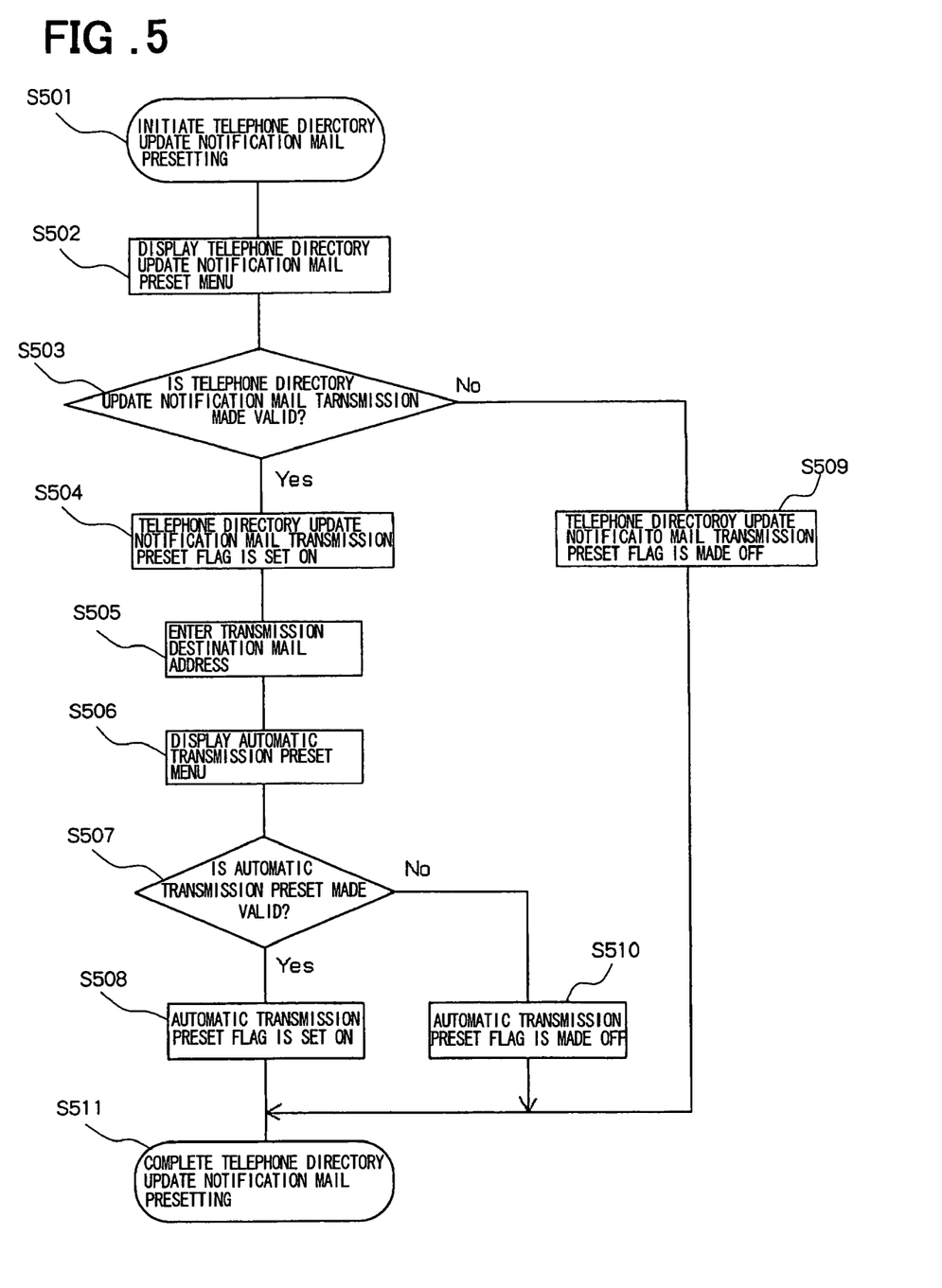
FIG. 5 is a flow chart explaining the operation of the mobile telephone terminal which is shown in FIG. 2

FIG. 5 is a flow chart explaining an operation for presetting a telephone directory update notification mail transmission preset flag 204, automatic transmission preset flag 205 and transmission destination mail address 206 for controlling the transmission of the telephone directory update notification mail.

Now, the operation for presetting the telephone directory update notification mail transmission preset flag 204, automatic transmission preset flat 205 and transmission destination mail address 206 will be described with reference to FIG. 5.

When the user executes an entry to cause the display unit 213 to display the telephone directory update notification mail preset menu by actuating the key entry unit 214 (step S501), the control unit 211 causes the display unit 213 to display the telephone directory update notification mail preset menu (step S502). The telephone directory update notification preset menu which is displayed by the display unit 213 is a display for selecting any one of validation or invalidation of the telephone directory update notification mail transmission.

The user selects whether the telephone directory update notification mail transmission is valid or invalid by actuating the key entry 214 (step S503).

If the user selects validation of the telephone directory update notification mail transmission at step S503, the control unit 211 brings the telephone directory update notification mail transmission preset flag 204 into the on-state (step S504).

Subsequently, the control unit 211 causes the display unit 213 to display a transmission destination mail address entry shot.

The user enters the transmission destination mail address based upon the transmission destination mail address entry shot by actuating the key entry unit 214 (step S506).

If the transmission destination mail address is entered at step S506, the control unit 211 causes the display unit 213 to display the automatic transmission preset menu. The automatic transmission preset menu which is displayed by the display unit 213 is a display for selecting any one of validation and invalidation of the automatic transmission of the telephone directory update notification mail by the user.

The user selects any one of validation or invalidation of the automatic transmission of the telephone directory update notification mail by actuating the key entry unit 214 (step S507).

If the user selects validation (Yes) of the automatic transmission of the telephone directory update notification mail at step S507, the control unit 211 presets the automatic transmission preset flag 205 into on-state (step S508). If the user selects invalidation (No) of the automatic transmission of the telephone directory update notification mail a step S507, the control unit 211 presets the automatic transmission preset flag 205 into off-state (step S509).

If the step S508 or S509 is completed, the control unit 211 completes the presetting of the telephone directory update notification mail (step S511).

If the user selects invalidation (No) of the telephone directory update notification mail transmission at step S503, the control unit 211 presets the telephone directory update notification mail transmission preset flag 204 into off-state (step S509) and proceeds to step S511.

When the telephone directory information stored in the telephone directory storage unit 203 is updated based upon the update information entered from the key entry unit 214, a telephone directory update notification mail for storing at least update information in the external storage unit 104 is transmitted. Therefore, the period of time since the telephone directory information is updated until the updated content is stored in the external storage unit can be made shorter and the likelihood of the disappearing of the content which is updated prior to storing in the external storage unit can be reduced without requiring the user to conduct any operation for transmitting the updated content when the updated content is stored in the external storage unit.

If the updated content is transferred per unit of telephone number list on the one-by-one basis, the period of time for transferring the update information can be made shorter and the likelihood of that the telephone directory information is influenced by noise during transferring is reduced in comparison with the case where all the telephone directory information stored in the telephone directory storage unit is transferred to an external storage unit, by one operation.

In the present embodiment, an effect is similar to that as mentioned above can be provided and it is possible to automatically store a new telephone number list in an external storage unit whenever a new telephone number list is stored in the telephone directory storage unit.

In the present embodiment, an effect which is similar to that as mentioned above is obtained and it is possible to automatically store change information in an external storage unit whenever the content of desired telephone number list stored in the telephone directory storage unit is changed based upon the change information.

Since the pre-change desired telephone number list and changed desired telephone number list are stored in the external storage unit in the present invention, it is possible to acquire the pre-change telephone number list from the external storage unit even if the content of the telephone number list is changed to wrong content by erroneous operation for updating the telephone number list on the telephone directory storage unit.

Since a deleted desired telephone number list is stored in an external storage unit in the present embodiment, it is possible to acquire the deleted telephone number list from the external storage unit even if the telephone number list is deleted by an erroneous operation for updating of the telephone number list on the telephone number list on the telephone directory storage unit.

Since there is provided an automatic transmission preset flag 205 which enables the user to preset whether or not an automatic transmission of the telephone directory update notification mail is to be conducted, it is possible to preset whether or not the automatic transmission of the telephone directory notification mail is to be conducted.

If the automatic transmission preset flag 205 presets so that automatic transmission of the telephone directory update notification mail is not to be conducted, the control unit 211 causes the display unit 213 to display a display shot to prompt the user to select whether or not the telephone directory update notification mail is to be transmitted to the storage unit 104*a* in the personal computer 104. Therefore, it is possible to confirm whether or not the updated telephone directory information is stored in the storage unit 104*a* whenever the telephone directory information is updated.

Accordingly, it is possible to prevent the important information of the updated telephone directory information from being stored in the storage unit 104*a* in the personal computer 104 and it is not necessary to conduct less important operation such as storing of less important information of the updated telephone directory information.

Although the embodiment in which an electronic mail is used as the update information back-up signal for storing at least update information in the external storage unit 104*a* has been described, the update information back-up signal is not limited to the electronic mail.

In case in which the electronic mail is used as an update information back-up signal, it is possible to easily implement the present embodiment by only changing the program of the mobile telephone terminal without changing the program in the personal computer if the mobile telephone terminal is capable of transmitting the electronic mail to the personal computer via the Internet.

The configuration of the embodiment which has been described is only illustrative. The present invention is not limited to the illustrated configuration and embodiment.

For example, the telephone directory update notification mail transmission preset flag 204 may be omitted. In this case, the control unit 211 executes step S309 subsequently to S304 and executes step S309 subsequently to step S307 in FIG. 3.

Furthermore, for example, the automatic transmission preset flag 205 may be omitted. In this case, the control unit 211 proceeds to step S312 if the telephone directory update notification mail transmission preset flag 204 is in the on-state at step S308 in FIG. 3.

For example, telephone directory update notification mail transmission preset flag 204 and the automatic transmission preset flag 205 may be omitted. In this case, the control unit 211 executes step S321 subsequently to step S304 and executes step S312 subsequently to step S307 in FIG. 3.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A mobile telephone terminal comprising:
   a telephone directory storage unit for storing telephone directory information including at least one telephone number list having telephone number information representative of at least a telephone number and identification information for identifying an object related with said telephone number;
   an information entry unit to which update information is entered; and
   an information control unit which updates said telephone directory information based upon update information when the update information is entered into said information entry unit, and transmits an update information back-up signal representative of updated content.

2. A mobile telephone terminal as defined in claim 1, wherein
   a new telephone number list is entered to said information entry unit as said update information; and
   when said telephone number list is entered to said information entry unit, said information control unit updates said telephone directory information by storing a new telephone number list in said telephone directory storage unit and transmits an update information back-up signal representative of said new telephone number list.

3. A mobile telephone terminal as defined in claim 1, wherein
   change information representative of a content of a change in information possessed by a desired telephone number list stored in said telephone directory storage unit is entered into said information entry unit as said update information; and
   when change information is entered to said information entry unit, said information control unit updates said telephone directory information by changing information possessed by said desired telephone number list and transmits an update back-up signal representative of changed content.

4. A mobile telephone terminal as defined in claim 3, wherein
   when said information control unit performs said update, said information control unit transmits an update information back-up signal which is representative of a desired pre-change telephone number list and changed desired telephone number list.

5. A mobile telephone terminal as defined in claim 1, wherein
   deletion information for deleting a desired telephone number list stored in said telephone directory storage unit is entered into said information entry unit as said deletion information; and
   when said deletion information is entered to said information entry unit, said information control unit updates said telephone directory information by deleting said desired telephone number list and transmits an update back-up signal representative of deleted desired telephone number list.

6. A system for back-up of telephone directory information, comprising a mobile telephone terminal and a storage unit which is connectable with said mobile telephone terminal via a communication network, wherein
   said mobile telephone terminal comprises:
   a telephone directory storage unit for storing telephone directory information including at least one telephone number list having telephone number information representative of at least a telephone number and identification information for identifying an object related with said telephone number;
   an information entry unit to which update information is entered; and
   an information control unit which updates said telephone directory information based upon update information when the update information is entered into said information entry unit, and transmits an update information back-up signal representative of updated content,
   said latter storage unit which is connectable with said mobile telephone terminal stores said update information back-up signal.

7. A system for back-up of telephone directory information as defined in claim 6, wherein
   a new telephone number list is entered to said information entry unit as said update information; and
   when said telephone number list is entered to said information entry unit, said information control unit updates said telephone directory information by storing a new telephone number list in said telephone directory storage unit and transmits an update information back-up signal representative of said new telephone number list.

8. A system for back-up of telephone directory information as defined in claim 6, wherein
   change information representative of a content of a change in information possessed by a desired telephone number list stored in said telephone directory storage unit is entered into said information entry unit as said update information; and when change information is entered to said information entry unit, said information control unit updates said telephone directory information by changing information possessed by said desired telephone number list and transmits an update back-up signal representative of changed content.

9. A system for back-up of telephone directory information as defined in claim 8, wherein
when said information control unit performs said update, said information control unit transmits an update information back-up signal which is representative of a desired pre-change telephone number list and changed desired telephone number list.

10. A system for back-up of telephone directory information as defined in claim 6, wherein
deletion information for deleting a desired telephone number list stored in said telephone directory storage unit is entered into said information entry unit as said deletion information; and
when said deletion information is entered to said information entry unit, said information control unit updates said telephone directory information by deleting said desired telephone number list and transmits an update back-up signal representative of deleted desired telephone number list.

11. A method of the back-up of telephone directory information of a mobile telephone terminal comprising a telephone directory storage unit for storing telephone directory information containing at least one telephone number list having telephone number information representative of telephone number and identification information for identifying an object related with said telephone number, characterized in that said method comprises the steps of:
entering update information;
updating said telephone directory information based upon said update information which is entered at said step of entering update information; and
transmitting an update information back-up signal representative of a content which is updated at said updating step.

12. A method of the back-up of telephone directory information of a mobile telephone terminal as defined in claim 11 wherein
a new telephone number list is entered as said update information at said information entering step,
said telephone directory information being updated by storing said new telephone number list entered at said information entering step in said telephone directory storage unit at said updating step; and
subsequent to said updating step, said update information back-up signal representative of said new telephone number list being transmitted at said transmitting step.

13. A method of the back-up of telephone directory information of a mobile telephone terminal as defined in claim 11, wherein
the change information representative of the contents to be changed of the information possessed by a desired telephone number list stored in said telephone directory storage unit is entered as said update information at said information entering step,
said telephone directory information being updated at said updating step by changing the information possessed by said desired telephone number list based upon the change information entered at said information entering step; and
subsequent to said updating step, said update information back-up signal representative of said change information being transmitted at said transmitting step.

14. A method of the back-up of the telephone directory information of a mobile telephone terminal as defined in claim 13, wherein
subsequent to said updating step, said update information back-up signal which is representative of the pre-change desired telephone number list and the changed desired telephone number list is transmitted at said transmitting step.

15. A method of the back-up of telephone directory information of a mobile telephone terminal as defined in claim 11, wherein
deletion information for deleting a desired telephone number list stored in said telephone directory storage unit is entered as said deletion information at said information entering step,
said telephone directory information being deleted at said updating step by deleting said desired telephone number list based upon the deletion information entered at said information entering step; and
subsequent to said updating step, said update information back-up signal representative of said deleted desired telephone number list being transmitted at said transmitting step.

16. A method of the back-up of telephone directory information of a mobile telephone terminal as defined in claim 11, wherein
said method further includes a step of storing said update information back-up signal in a storage unit based upon the update information back-up signal transmitted at said transmitting step.

* * * * *